April 24, 1951

E. LABIN 2,549,825

RECEIVER

Filed May 28, 1945

INVENTOR.
EMILE LABIN

BY Percy P. Lantzy
ATTORNEY

UNITED STATES PATENT OFFICE 2,549,825

RECEIVER

Emile Labin, New York, N. Y., assignor to Federal Telephone and Radio Corporation, New York, N. Y., a corporation of Delaware Application May 28, 1945, Serial No. 596,151

2 Claims. (Cl. 250—20)

This invention relates to new and useful improvements in the reception of electrical voltage impulses which are modulated in accordance with intelligence signals that it is desired to transmit.

Pulses modulated in accordance with their time displacement, frequency, or the like are in the receiver often differentiated at video frequencies before they are demodulated or observed for measurement. The intermediate frequency amplifier of the receiver is customarily designed uniformly to respond to frequencies within the signal frequency range. Such intermediate frequency amplifiers are more expensive than amplifiers having a narrower or mutilated response curve, or one with a profound dip at a predetermined frequency and a more or less linear rise to the highest and lowest frequencies.

In accordance with the present invention, modulated pulses are differentiated or more generally distorted in a predetermined manner in an intermediate frequency amplifier which does not have a uniform response curve. The amplifier here disclosed has a double hump response curve. The two humps of the response curve may, for instance, be one megacycle apart, and the receiver may be tuned so as to place the carrier frequency on which the signal pulses are transmitted in the center of the curve between the two humps, i. e., at the point where the response curve dips the lowest. Such a simple amplifier may be used wherever the reception of the exact pulse shape is not necessary to convey intelligence, e. g., in time pulse modulation or in radar systems or similar systems, where all one wants to know is whether the pulse front exists at a particular time.

An important application of this invention is in minimizing jamming interference. Jamming pulses might be pulses sent at the carrier frequency or continuous carrier. By adjusting the receiver so that the frequency components of the jamming signal will fall in the trough of the response curve of the intermediate frequency amplifier, their effect can be greatly minimized.

Figure 1:
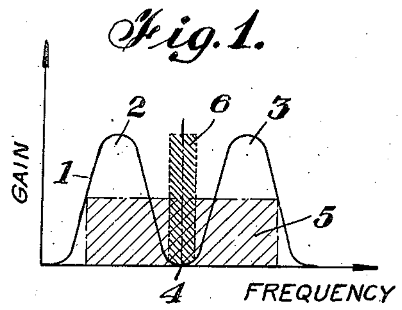
Fig. 1 is a graph illustrating the principle of the invention.
Figure 2:
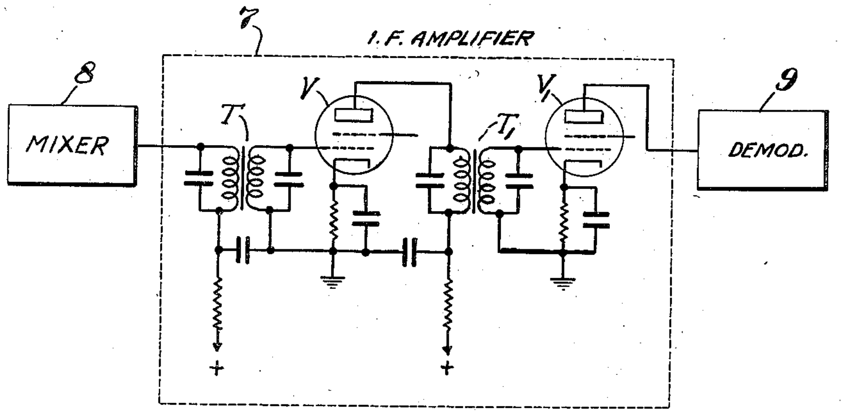
Fig. 2 is a circuit diagram of a suitable intermediate frequency amplifier.

The frequency response curve 1 of an intermediate frequency amplifier like the one shown at 7 in Fig. 2 has two humps 2 and 3, and a dip 4. The centre of the intermediate frequency emanating from the mixer 8 is indicated at 4 and an interfering signal is represented at 6, adjacent to said centre frequency. This can be attained by adjusting the first stage of tne amplifier consisting of transformer T and tube V to respond as shown in part 2 of the curve, and the second stage $T_1$ and $V_1$ to respond as indicated in part 3.

The intermediate frequency amplifier 7 whose input and output are connected respectively with a mixer 8 and a demodulator 9 may be of any other suitable design.

I claim:

1. A pass-band amplifier comprising input and output transformers coupled in cascade, the frequency response of respective of said transformers being maximum on either side of the centre frequency of said pass-band and the over-all frequency response of said amplifier being maximum on either side of and substantially zero at said centre frequency, whereby noise components within said pass-band occurring adjacent said centre frequency are minimized, and means for demodulating the output of said amplifier.

2. A pass-band amplifier as claimed in claim 1, wherein said amplifier comprises two stages, each stage including a different one of said transformers.

EMILE LABIN.

REFERENCES CITED

The following references are of record in the file of this patent:

UNITED STATES PATENTS

| Number | Name | Date |
|---|---|---|
| 1,703,184 | Von Arco | Feb. 26, 1929 |
| 1,717,455 | Kolster | June 18, 1929 |
| 1,907,669 | Roberts | May 9, 1933 |
| 1,937,564 | Grebe | Dec. 5, 1933 |
| 1,938,620 | Braden | Dec. 12, 1933 |
| 2,115,377 | Weyers | Apr. 26, 1938 |
| 2,280,563 | Weinberger | Apr. 21, 1942 |
| 2,369,621 | Travis | Feb. 13, 1945 |
| 2,428,366 | Gilman | Oct. 7, 1949 |